US010528794B2

(12) United States Patent
Koskan et al.

(10) Patent No.: US 10,528,794 B2
(45) Date of Patent: Jan. 7, 2020

(54) SYSTEM AND METHOD FOR TAILORING AN ELECTRONIC DIGITAL ASSISTANT INQUIRY RESPONSE AS A FUNCTION OF PREVIOUSLY DETECTED USER INGESTION OF RELATED VIDEO INFORMATION

(71) Applicant: MOTOROLA SOLUTIONS, INC, Chicago, IL (US)

(72) Inventors: Patrick D. Koskan, Jupiter, FL (US); Alejandro G. Blanco, Fort Lauderdale, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 158 days.

(21) Appl. No.: 15/613,336

(22) Filed: Jun. 5, 2017

(65) Prior Publication Data

US 2018/0349678 A1 Dec. 6, 2018

(51) Int. Cl.
*G06K 9/00* (2006.01)
*H04N 5/225* (2006.01)
(Continued)

(52) U.S. Cl.
CPC ......... *G06K 9/00201* (2013.01); *G06F 3/013* (2013.01); *G06F 16/00* (2019.01); *G06F 17/27* (2013.01); *G06K 9/00228* (2013.01); *G06K 9/00604* (2013.01); *G06Q 10/00* (2013.01); *G06Q 50/26* (2013.01)

(58) Field of Classification Search
None
See application file for complete search history.

(56) References Cited

U.S. PATENT DOCUMENTS 8,611,601 B2 12/2013 Calman et al.
9,047,256 B2 6/2015 Carlson et al.
(Continued)

FOREIGN PATENT DOCUMENTS

WO 2006100645 A2 9/2006

OTHER PUBLICATIONS

Fletcher et al. "Driver Inattention Detection based on Eye Gaze Road Event Correlation", 2009, The International Journal of Robotics Research. (Year: 2009).*

(Continued)

*Primary Examiner* — Randolph I Chu
(74) *Attorney, Agent, or Firm* — Daniel R. Bestor

(57) ABSTRACT

A process at an electronic computing device that tailors an electronic digital assistant generated inquiry response as a function of previously detected user ingestion of related information includes receiving, from a video capture device configured to track a gaze direction of a first user, a video stream including a first field-of-view of the first user. An object is then identified in the video stream first field-of-view remaining in the first field-of-view for a determined threshold period of time, and the object processed via a video processing algorithm to produce object information, which is then stored. Subsequently, an inquiry is received from the first user for information, and it is determined that the inquiry is related to the object information. The electronic digital assistant then provides a response to the inquiry as a function of the object information.

20 Claims, 3 Drawing Sheets

(51) Int. Cl.
*G06F 3/01* (2006.01)
*G06F 17/27* (2006.01)
*G06F 16/00* (2019.01)
*G06Q 50/26* (2012.01)
*G06Q 10/00* (2012.01)

(56) References Cited

U.S. PATENT DOCUMENTS

| | | | | |
|---|---|---|---|---|
| 9,218,063 | B2* | 12/2015 | Galor | G06F 3/017 |
| 9,250,703 | B2* | 2/2016 | Hernandez-Abrego | |
| | | | | G10L 15/26 |
| 9,363,093 | B2 | 6/2016 | Giventhal et al. | |
| 9,823,742 | B2* | 11/2017 | Parker | G06F 3/013 |
| 2008/0147488 | A1* | 6/2008 | Tunick | G06Q 30/02 |
| | | | | 705/7.29 |
| 2009/0315827 | A1* | 12/2009 | Elvesjo | G06F 3/013 |
| | | | | 345/157 |
| 2011/0237287 | A1 | 9/2011 | Klein et al. | |
| 2013/0304479 | A1* | 11/2013 | Teller | G06F 3/013 |
| | | | | 704/275 |
| 2015/0009117 | A1 | 1/2015 | Peters | |
| 2016/0085302 | A1* | 3/2016 | Publicover | G06F 21/64 |
| | | | | 345/633 |
| 2017/0039869 | A1* | 2/2017 | Gleim | G09B 5/12 |
| 2017/0200296 | A1* | 7/2017 | Jones | G06T 11/60 |
| 2018/0075659 | A1* | 3/2018 | Browy | G06T 19/006 |
| 2018/0192057 | A1* | 7/2018 | Ardo | H04N 19/114 |
| 2018/0275753 | A1* | 9/2018 | Publicover | G06F 3/013 |
| 2018/0374069 | A1* | 12/2018 | Frankel | H04W 4/35 |
| 2019/0171350 | A1* | 6/2019 | Sugihara | G06F 3/01 |

OTHER PUBLICATIONS

The International Search Report and the Written Opinion, corresponding patent application No. PCT/US2018/034397 filed May 24, 2018, dated Oct. 17, 2018, all pages.

* cited by examiner

SYSTEM AND METHOD FOR TAILORING AN ELECTRONIC DIGITAL ASSISTANT INQUIRY RESPONSE AS A FUNCTION OF PREVIOUSLY DETECTED USER INGESTION OF RELATED VIDEO INFORMATION

BACKGROUND OF THE INVENTION

Tablets, laptops, phones (e.g., cellular or satellite), mobile (vehicular) or portable (personal) two-way radios, and other mobile computing devices are now in common use by users, such as first responders (including firemen, police officers, and paramedics, among others), and provide such users and others with instant access to increasingly valuable additional information and resources such as vehicle histories, arrest records, outstanding warrants, health information, real-time traffic or other situational status information, and any other information that may aid the user in making a more informed determination of an action to take or how to resolve a situation, among other possibilities.

Many such mobile computing devices further comprise, or provide access to, electronic digital assistants (or sometimes referenced as "virtual partners") that can provide the user thereof with valuable information in an automated (e.g., without further user input) or semi-automated (e.g., with some further user input) fashion. The valuable information provided to the user can be based on explicit requests for such information posed by the user via an input (e.g., such as a parsed natural language input or an electronic touch interface manipulation associated with an explicit request) in which the electronic digital assistant may reactively provide such requested valuable information, or can be based on some other set of one or more context or triggers in which the electronic digital assistant may proactively provide such valuable information to the user absent any explicit request from the user.

As some existing examples, electronic digital assistants such as Siri provided by Apple, Inc.® and Google Now provided by Google, Inc.®, are software applications running on underlying electronic hardware that are capable of understanding natural language, and may complete electronic tasks in response to user voice inputs, among other additional or alternative types of inputs. These electronic digital assistants may perform such tasks as taking and storing voice dictation for future reference and retrieval, reading a received text message or an e-mail message aloud, generating a text message or e-mail message reply, looking up requested phone numbers and initiating a phone call to a requested contact, generating calendar appointments and providing appointment reminders, warning users of nearby dangers such as traffic accidents or environmental hazards, and providing many other types of information in a reactive or proactive manner.

Furthermore, as the number of fixed, body-worn, and vehicle-equipped cameras available to users and accessible across departments and organizations increases, the opportunity and ability to identify and categorize objects of interest in real-time and use this information to supplement electronic digital assistant accessible information improves as well.

However, while conventional electronic digital assistants may be capable of sourcing these video streams when providing responses to user inquiries, such conventional electronic digital assistants have not been successful in more intelligently filtering such information for forming responses to user inquiries.

Thus, there exists a need for an improved technical method, device, and system for an electronic digital assistant to computationally process video relative to a determined user's perception of such video and to tailor the electronic digital assistant's inquiry response to a subsequent query from the user accordingly.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
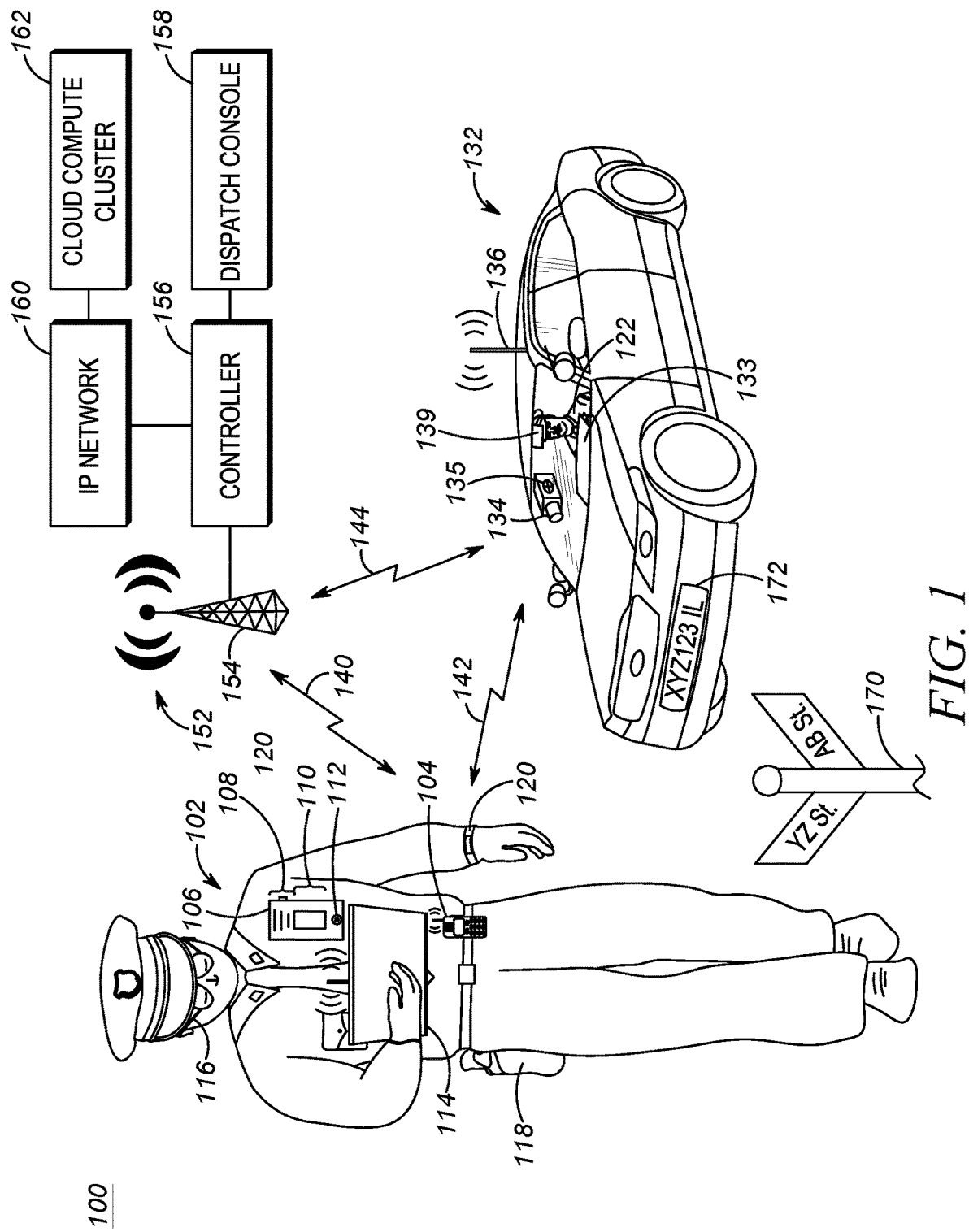
FIG. 1 is a system diagram illustrating a system for operating an electronic digital assistant, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed is an improved technical method, device, and system for an electronic digital assistant to computationally process video relative to a determined user's perception of such video and to tailor the electronic digital assistant's inquiry response to a subsequent query from the user accordingly.

In one embodiment, a process for tailoring an electronic digital assistant generated inquiry response as a function of previously detected user ingestion of related information includes: receiving, at an electronic processing device from a video capture device configured to track a gaze direction of a first user, a video stream including a first field-of-view substantially matching a field-of-view of the first user; identifying, by the electronic processing device, an object in the video stream first field-of-view remaining in the first field-of-view for a determined threshold period of time and, responsively, processing the object via a video processing algorithm and causing, by the electronic processing device, object information regarding the object output from the video processing algorithm to be stored in a non-volatile store; subsequently receiving, at the electronic processing device, an inquiry for information from the first user; determining, by the electronic processing device, that the inquiry is related to the object information; and providing, by the electronic processing device, a response to the inquiry as a function of the object information.

In a further embodiment, an electronic processing device for tailoring an artificial intelligence inquiry response as a function of previously detected user ingestion of related information includes: a memory; a transceiver; and one or more processors configured to: receive, from a video capture device configured to track a gaze direction of a first user, a video stream including a first field-of-view substantially matching a field-of-view of the first user; identify an object in the video stream first field-of-view remaining in the first field-of-view for a determined threshold period of time and, responsively, process the object via a video processing algorithm and causing, by the electronic processing device, object information regarding the object output from the video processing algorithm to be stored in a non-volatile store; subsequently receive an inquiry for information from the first user; determine that the inquiry is related to the object information; and provide a response to the inquiry, via one of the transceiver, a display communicatively coupled to the electronic computing device, or a speaker communicatively coupled to the electronic computing device, as a function of the object information.

Each of the above-mentioned embodiments will be discussed in more detail below, starting with example communication system and device architectures of the system in which the embodiments may be practiced, followed by an illustration of processing steps for achieving the improved technical method, device, and system for an electronic digital assistant to computationally process video relative to a determined user's perception of such video and to tailor the electronic digital assistant's inquiry response to a subsequent query from the user accordingly. Further advantages and features consistent with this disclosure will be set forth in the following detailed description, with reference to the figures.

1. COMMUNICATION SYSTEM AND DEVICE STRUCTURES a. Communication System Structure Referring now to the drawings, and in particular FIG. 1, a communication system diagram illustrates a system 100 of devices including a first set of devices that a user 102 (illustrated in FIG. 1 as a first responder police officer) may wear, such as a primary battery-powered portable radio 104 used for narrowband and/or broadband direct-mode or infrastructure communications, a battery-powered radio speaker microphone (RSM) video capture device 106, a laptop 114 having an integrated video camera and used for data applications such as incident support applications, smart glasses 116 (e.g., which may be virtual reality, augmented reality, or mixed reality glasses, may include a video camera, and/or may include a head-tracking and/or eye-tracking function), sensor-enabled holster 118, and/or biometric sensor wristband 120. Although FIG. 1 illustrates only a single user 102 with a respective first set of devices, in other embodiments, the single user 102 may include additional sets of same or similar devices, and additional users may be present with respective additional sets of same or similar devices.

System 100 may also include a vehicle 132 associated with the user 102 (the user 102 illustrated as potentially alternatively sitting in a driver's seat of vehicle 132 in FIG. 1 instead of standing outside of it) having an integrated vehicular computing device 133, an associated vehicular video camera 134 and/or microphone 135, a coupled vehicular transceiver 136, and a head and/or eye-tracking device 139. Although FIG. 1 illustrates only a single vehicle 132 with a respective single vehicular computing device 133, single vehicular video camera 134 and single transceiver 136, in other embodiments, the vehicle 132 may include additional same or similar computing devices, video cameras and/or transceivers, and additional vehicles may be present with respective additional sets of computing devices, video cameras, and/or transceivers.

Each of the portable radio 104, RSM video capture device 106, laptop 114, and vehicular computing device 133 may be capable of directly wirelessly communicating via direct-mode wireless link(s) 142, and/or may be capable of wirelessly communicating via a wireless infrastructure radio access network (RAN) 152 over respective wireless link(s) 140, 144 and via corresponding transceiver circuits.

The portable radio 104, in particular, may be any mobile computing device used for infrastructure RAN or direct-mode media (e.g., voice, audio, video, etc.) communication via a long-range wireless transmitter and/or transceiver that has a transmitter transmit range on the order of miles, e.g., 0.5-50 miles, or 3-20 miles (e.g., in comparison to a short-range transmitter such as a Bluetooth, Zigbee, or NFC transmitter) with other mobile computing devices and/or the infrastructure RAN 152. The long-range transmitter may implement a direct-mode, conventional, or trunked land mobile radio (LMR) standard or protocol such as ETSI Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, the long range transmitter may implement a Long Term Evolution (LTE), LTE-Advance, or 5G protocol including multimedia broadcast multicast services (MBMS) or single site point-to-multipoint (SC-PTM) over which an open mobile alliance (OMA) push to talk (PTT) over cellular (OMA-PoC), a voice over IP (VoIP), an LTE Direct or LTE Device to Device, or a PTT over IP (PoIP) application may be implemented. In still further embodiments, the long range transmitter may implement a Wi-Fi protocol perhaps in accordance with an IEEE 802.11 standard (e.g., 802.11a, 802.11b, 802.11g) or a WiMAX protocol perhaps operating in accordance with an IEEE 802.16 standard.

In the example of FIG. 1, the portable radio 104 may form the hub of communication connectivity for the user 102, through which other accessory devices such as a biometric sensor (for example, the biometric sensor wristband 120), an activity tracker, a weapon status sensor (for example, the sensor-enabled holster 118), a heads-up-display (for example, the smart glasses 116), the RSM video capture device 106, and/or the laptop 114 may communicatively couple.

In order to communicate with and exchange video, audio, and other media and communications with the RSM video capture device 106, laptop 114, and/or smart glasses 116, the portable radio 104 may contain one or more physical electronic ports (such as a USB port, an Ethernet port, an audio jack, etc.) for direct electronic coupling with the RSM video capture device 106, laptop 114, and/or smart glasses 116 and/or may contain a short-range transmitter (e.g., in comparison to the long-range transmitter such as a LMR or Broadband transmitter) and/or transceiver for wirelessly coupling with the RSM video capture device 106, laptop 114, and/or smart glasses 116. The short-range transmitter may be a Bluetooth, Zigbee, or NFC transmitter having a transmit range on the order of 0.01-100 meters, or 0.1-10 meters.

In other embodiments, the RSM video capture device 106, the laptop 114, and/or the smart glasses 116 may contain their own long-range transceivers and may communicate with one another and/or with the infrastructure RAN 152 or vehicular transceiver 136 directly without passing through portable radio 104.

The RSM video capture device 106, in particular, provides voice functionality features similar to a traditional RSM, including one or more of acting as a remote microphone that is closer to the user's 102 mouth, providing a remote speaker allowing play back of audio closer to the user's 102 ear, and including a PTT switch or other type of PTT input. The voice and/or audio recorded at the remote microphone may be provided to the portable radio 104 for storage and/or analysis or for further transmission to other mobile communication devices or the infrastructure RAN 152, or may be directly transmitted by the RSM video capture device 106 to other mobile computing devices or to the infrastructure RAN 152. The voice and/or audio played back at the remote speaker may be received from the portable radio 104 or received directly from one or more other mobile computing devices or the infrastructure RAN 152. The RSM video capture device 106 may include a separate physical PTT switch 108 that functions, in cooperation with the portable radio 104 or on its own, to maintain the portable radio 104 and/or RSM video capture device 106 in a monitor only mode, and which switches the device(s) to a transmit-only mode (for half-duplex devices) or transmit and receive mode (for full-duplex devices) upon depression or activation of the PTT switch 108. The portable radio 104 and/or RSM video capture device 106 may form part of a group communications architecture that allows a single mobile computing device to communicate with one or more group members (not shown) associated with a particular group of devices at a same time.

Additional features may be provided at the RSM video capture device 106 as well. For example, a display screen 110 may be provided for displaying images, video, and/or text to the user 102 or to someone else. The display screen 110 may be, for example, a liquid crystal display (LCD) screen or an organic light emitting display (OLED) display screen. In some embodiments, a touch sensitive input interface may be incorporated into the display screen 110 as well, allowing the user 102 to interact with content provided on the display screen 110. A soft PTT input may also be provided, for example, via such a touch interface.

A video camera 112 may be further provided at the RSM video capture device 106, integrating an ability to capture images and/or video and store the captured image data (for further analysis) or transmit the captured image data as an image or video stream to the portable radio 104 and/or to other mobile computing devices or to the infrastructure RAN 152 directly. The video camera 112 and RSM remote microphone may be used, for example, for capturing audio and/or video of a field-of-view associated with the user 102, storing the captured audio and/or video data for further analysis or transmitting the captured audio and/or video data as an audio and/or video stream to the portable radio 104 and/or to other mobile computing devices or to the infrastructure RAN 152 directly for further analysis. The RSM remote microphone may be an omni-directional or unidirectional microphone or array of omni-directional or unidirectional microphones that may be capable of identifying a direction from which a captured sound emanated.

In some embodiments, the RSM video capture device 106 may be replaced with a more limited body worn camera that may include the video camera 112 and/or microphone noted above for capturing audio and/or video, but may forego one or more of the features noted above that transform the body worn camera into a more full featured RSM, such as the separate physical PTT switch 108 and the display screen 110, and remote microphone functionality for voice communications in cooperation with portable radio 104.

The laptop 114, in particular, may be any wireless computing device used for infrastructure RAN or direct-mode media communication via a long-range or short-range wireless transmitter with other mobile computing devices and/or the infrastructure RAN 152. The laptop 114 includes a display screen for displaying a user interface to an operating system and one or more applications running on the operating system, such as a broadband PTT communications application, a web browser application, a vehicle history database application, a workflow application, a forms or reporting tool application, an arrest record database application, an outstanding warrant database application, a mapping and/or navigation application, a health information database application, or other types of applications that may require user interaction to operate. The laptop 114 display screen may be, for example, an LCD screen or an OLED display screen. In some embodiments, a touch sensitive input interface may be incorporated into the display screen as well, allowing the user 102 to interact with content provided on the display screen. A soft PTT input may also be provided, for example, via such a touch interface.

Front and/or rear-facing video cameras may be further provided at the laptop 114, integrating an ability to capture video and/or audio of the user 102 and/or a field of view substantially matching the user's 102, and store and/or otherwise process the captured video and/or audio for further analysis or transmit the captured video and/or audio as a video and/or audio stream to the portable radio 104, other mobile computing devices, and/or the infrastructure RAN 152 for further analysis.

The smart glasses 116 may include a digital imaging device, a computing device, a short-range and/or long-range transceiver device, and/or a projecting device. The smart glasses 116 may maintain a bi-directional communications connection with the portable radio 104 and provide an always-on or on-demand video feed pointed in a direction of the user's 102 gaze via the digital imaging device, and/or may provide a personal display via the projection device integrated into the smart glasses 116 for displaying to its user information such as text, images, or video received from the portable radio 104 or directly from the infrastructure RAN 152. In some embodiments, an additional user interface mechanism such as a touch interface or gesture detection mechanism may be provided at the smart glasses 116 that allows the user 102 to interact with the display elements displayed on the smart glasses 116 or projected into the user's 102 eyes, or to modify operation of the digital imaging device, while in other embodiments, a display and input interface at the portable radio 104 may be provided for interacting with smart glasses 116 content and modifying operation of the digital imaging device, among other possibilities.

The smart glasses 116 may provide a virtual reality interface in which a computer-simulated reality electronically replicates an environment with which the user 102 may interact, may provide an augmented reality interface in which a direct or indirect view of real-world environments in which the user is currently disposed are augmented, i.e., supplemented, by additional computer-generated sensory input such as sound, video, images, graphics, GPS data, or other information, or may provide a mixed reality interface in which electronically generated objects are inserted in a direct or indirect view of real-world environments in a manner such that they may co-exist and interact in real time with the real-world environment and real world objects.

The sensor-enabled holster 118 may be an active (powered) or passive (non-powered) sensor that maintains and/or provides state information regarding a weapon or other item normally disposed within the user's 102 sensor-enabled holster 118. The sensor-enabled holster 118 may detect a change in state (presence to absence) and/or an action (removal) relative to the weapon normally disposed within the sensor-enabled holster 118. The detected change in state and/or action may be reported to the portable radio 104 via its short-range transceiver. In some embodiments, the sensor-enabled holster 118 may also detect whether the first responder's hand is resting on the weapon even if it has not yet been removed from the holster and provide such information to portable radio 104. Other possibilities exist as well.

The biometric sensor wristband 120 may be an electronic device for tracking an activity of the user 102 or a health status of the user 102, and may include one or more movement sensors (such as an accelerometer, magnetometer, and/or gyroscope) that may periodically or intermittently provide to the portable radio 104 indications of orientation, direction, steps, acceleration, and/or speed, and indications of health such as one or more of a captured heart rate, a captured breathing rate, and a captured body temperature of the user 102, perhaps accompanying other information. In some embodiments, the biometric sensor wristband 120 may include its own long-range transceiver and may communicate with other communication devices and/or with the infrastructure RAN 152 or vehicular transceiver 136 directly without passing through portable radio 104.

An accelerometer is a device that measures acceleration. Single and multi-axis models are available to detect magnitude and direction of the acceleration as a vector quantity, and can be used to sense orientation, acceleration, vibration shock, and falling. A gyroscope is a device for measuring or maintaining orientation, based on the principles of conservation of angular momentum. One type of gyroscope, a microelectromechanical system (MEMS) based gyroscope, uses lithographically constructed versions of one or more of a tuning fork, a vibrating wheel, or resonant solid to measure orientation. Other types of gyroscopes could be used as well. A magnetometer is a device used to measure the strength and/or direction of the magnetic field in the vicinity of the device, and can be used to determine a direction in which a person or device is facing.

The heart rate sensor may use electrical contacts with the skin to monitor an electrocardiography (EKG) signal of its wearer, or may use infrared light and imaging device to optically detect a pulse rate of its wearer, among other possibilities.

A breathing rate sensor may be integrated within the sensor wristband 120 itself, or disposed separately and communicate with the sensor wristband 120 via a short range wireless or wired connection. The breathing rate sensor may include use of differential capacitive circuits or capacitive transducers to measure chest displacement and thus breathing rates. In other embodiments, a breathing sensor may monitor a periodicity of mouth and/or nose-exhaled air (e.g., using a humidity sensor, temperature sensor, capnometer or spirometer) to detect a respiration rate. Other possibilities exist as well.

A body temperature sensor may include an electronic digital or analog sensor that measures a skin temperature using, for example, a negative temperature coefficient (NTC) thermistor or a resistive temperature detector (RTD), may include an infrared thermal scanner module, and/or may include an ingestible temperature sensor that transmits an internally measured body temperature via a short range wireless connection, among other possibilities.

Although the biometric sensor wristband 120 is shown in FIG. 1 as a bracelet worn around the wrist, in other examples, the biometric sensor wristband 120 may additionally and/or alternatively be worn around another part of the body, or may take a different physical form including an earring, a finger ring, a necklace, a glove, a belt, or some other type of wearable, ingestible, or insertable form factor.

The portable radio 104, RSM video capture device 106, laptop 114, smart glasses 116, sensor-enabled holster 118, and/or biometric sensor wristband 120 may form a personal area network (PAN) via corresponding short-range PAN transceivers, which may be based on a Bluetooth, Zigbee, or other short-range wireless protocol having a transmission range on the order of meters, tens of meters, or hundreds of meters.

The portable radio 104 and/or RSM video capture device 106 (or any other device in FIG. 1 for that matter) may each include a location determination device integrated with or separately disposed but communicably coupled to the portable radio 104 and/or RSM 106 and/or in respective receivers, transmitters, or transceivers of the portable radio 104 and RSM 106 for determining a location of the portable radio 104 and RSM 106. The location determination device may be, for example, a global positioning system (GPS) receiver or wireless triangulation logic using a wireless receiver or transceiver and a plurality of wireless signals received at the wireless receiver or transceiver from different locations, among other possibilities. The location determination device may also include an orientation sensor for determining an orientation that the device is facing. Each orientation sensor may include a gyroscope and/or a magnetometer. Other types of orientation sensors could be used as well. The location (and/or orientation) can then be stored locally and/or transmitted via the transmitter or transceiver to other computing devices and/or to the infrastructure RAN 152.

The vehicle 132 may include the vehicular computing device 133, the vehicular video camera 134 and/or microphone 135, the vehicular transceiver 136, and the head and/or eye-tracking device 139, all of which may be coupled to one another via a wired and/or wireless vehicle area network (VAN), perhaps along with other sensors physically or communicatively coupled to the vehicle 132. The vehicular transceiver 136 may include a long-range transceiver for directly wirelessly communicating with mobile computing devices such as the portable radio 104, the RSM 106, and the laptop 114 via wireless link(s) 142 and/or for wirelessly communicating with the infrastructure RAN 152 via wireless link(s) 144. The vehicular transceiver 136 may further include a short-range wireless transceiver or wired transceiver for communicably coupling between the vehicular computing device 133 and/or the vehicular video camera 134 in the VAN. The vehicular computing device 133 may, in some embodiments, include the vehicular transceiver 136 and/or the vehicular video camera 134 integrated therewith, and may operate to store and/or process video and/or audio produced by the video camera 134 and/or transmit the captured video and/or audio as a video and/or audio stream to the portable radio 104, other mobile computing devices, and/or the infrastructure RAN 152 for further analysis. The omni-directional or unidirectional microphone 135, or an array thereof, may be integrated in the video camera 134 and/or at the vehicular computing device 133 (or additionally or alternatively made available at a separate location of the vehicle 132) and communicably coupled to the vehicular computing device 133 and/or vehicular transceiver 136 for capturing audio and storing, processing, and/or transmitting the audio in a same or similar manner as set forth above with respect to the RSM 106.

The vehicle 132 may be a human-operable vehicle, or may be a self-driving vehicle operable under control of vehicular computing device 133 perhaps in cooperation with video camera 134 (which may include a visible-light camera, an infrared camera, a time-of-flight depth camera, and/or a light detection and ranging (LiDAR) device). Command information and/or status information such as location and speed may be exchanged with the self-driving vehicle via the VAN and/or the PAN (when the PAN is in range of the VAN or via the VAN's infrastructure RAN link).

The vehicle 132 and/or transceiver 136, similar to the portable radio 104 and/or respective receivers, transmitters, or transceivers thereof, may include a location (and/or orientation) determination device integrated with or separately disposed in the vehicular computing device 133 and/or transceiver 136 for determining (and storing and/or transmitting) a location (and/or orientation) of the vehicle 132.

In some embodiments, instead of a vehicle 132, a land, air, or water-based drone with same or similar audio and/or video and communications capabilities and same or similar self-navigating capabilities as set forth above may be disposed, and may similarly communicate with the user's 102 PAN and/or with the infrastructure RAN 152 to support the user 102 in the field.

The VAN may communicatively couple with the PAN disclosed above when the VAN and the PAN come within wireless transmission range of one another, perhaps after an authentication takes place there between, and one of the VAN and the PAN may provide infrastructure communications to the other, depending on the situation and the types of devices in the VAN and/or PAN and may provide interoperability and communication links between devices (such as video cameras) and sensors within the VAN and PAN.

Although the RSM 106, the laptop 114, the smart glasses 116, and the vehicle 132 are illustrated in FIG. 1 as providing example video cameras and/or microphones for use in capturing audio and/or video streams, other types of cameras and/or microphones could be used as well, including but not limited to, fixed or pivotable video cameras secured to lamp posts, automated teller machine (ATM) video cameras, other types of body worn cameras such as head-mounted cameras, other types of vehicular cameras such as roof-mounted cameras, or other types of audio and/or video recording devices accessible via a wired or wireless network interface same or similar to that disclosed herein.

Infrastructure RAN 152 is a radio access network that provides for radio communication links to be arranged within the network between a plurality of user terminals. Such user terminals may be mobile and may be known as 'mobile stations' or 'mobile devices,' and may include any one or more of the electronic computing devices illustrated in FIG. 1, among other possibilities. At least one other terminal, e.g. used in conjunction with mobile devices, may be a fixed terminal, e.g. a base station, eNodeB, repeater, and/or access point. Such a RAN typically includes a system infrastructure that generally includes a network of various fixed terminals, which are in direct radio communication with the mobile devices. Each of the fixed terminals operating in the RAN may have one or more transceivers which may, for example, serve mobile devices in a given region or area, known as a 'cell' or 'site', by radio frequency (RF) communication. The mobile devices that are in direct communication with a particular fixed terminal are said to be served by the fixed terminal. In one example, all radio communications to and from each mobile device within the RAN are made via respective serving fixed terminals. Sites of neighboring fixed terminals may be offset from one another and may provide corresponding non-overlapping or partially or fully overlapping RF coverage areas.

Infrastructure RAN 152 may operate according to an industry standard wireless access technology such as, for example, an LTE, LTE-Advance, or 5G technology over which an OMA-PoC, a VoIP, an LTE Direct or LTE Device to Device, or a PoIP application may be implemented. Additionally or alternatively, infrastructure RAN 152 may implement a WLAN technology such as Wi-Fi perhaps operating in accordance with an IEEE 802.11 standard (e.g., 802.11a, 802.11b, 802.11g) or such as a WiMAX perhaps operating in accordance with an IEEE 802.16 standard.

Infrastructure RAN 152 may additionally or alternatively operate according to an industry standard LMR wireless access technology such as, for example, the P25 standard defined by the APCO, the TETRA standard defined by the ETSI, the dPMR standard also defined by the ETSI, or the DMR standard also defined by the ETSI. Because these systems generally provide lower throughput than the broadband systems, they are sometimes designated as narrowband RANs.

Communications in accordance with any one or more of these protocols or standards, or other protocols or standards, may take place over physical channels in accordance with one or more of a TDMA (time division multiple access), FDMA (frequency divisional multiple access), OFDMA (orthogonal frequency division multiplexing access), or CDMA (code division multiple access) technique.

OMA-PoC, in particular and as one example of an infrastructure broadband wireless application, enables familiar PTT and "instant on" features of traditional half duplex mobile devices, but uses mobile devices operating over modern broadband telecommunications networks. Using OMA-PoC, wireless mobile devices such as mobile telephones and notebook computers can function as PTT half-duplex mobile devices for transmitting and receiving. Other types of PTT models and multimedia call models (MMCMs) could be used as well.

Floor control in an OMA-PoC session is generally maintained by a PTT server that controls communications between two or more wireless mobile devices. When a user of one of the mobile devices keys a PTT button, a request for permission to speak in the OMA-PoC session is transmitted from the user's mobile device to the PTT server using, for example, a real-time transport protocol (RTP) message. If no other users are currently speaking in the PoC session, an acceptance message is transmitted back to the user's mobile device and the user can then speak into a microphone of the device. Using standard compression/decompression (codec) techniques, the user's voice is digitized and transmitted using discrete auditory data packets (e.g., together which form an auditory data stream over time), such as according to RTP and internet protocols (IP), to the PTT server. The PTT server then transmits the auditory data packets to other users of the PoC session (e.g., to other mobile devices in the group of mobile devices or talkgroup to which the user is subscribed), using for example, one or more of a unicast, point to multipoint, or broadcast communication technique.

Infrastructure narrowband LMR wireless systems, on the other hand, may operate in either a conventional or trunked configuration. In either configuration, a plurality of mobile devices is partitioned into separate groups of mobile devices.

In a conventional narrowband radio system, each mobile device in a group is selected to a particular radio channel (frequency or frequency & time slot) for communications associated with that mobile device's group. Thus, each group is served by one channel, and multiple groups may share the same single frequency (in which case, in some embodiments, group IDs may be present in the group data to distinguish between groups using the same shared frequency).

In contrast, a trunked narrowband radio system and its mobile devices use a pool of traffic channels for virtually an unlimited number of groups of mobile devices (e.g., talkgroups). Thus, all groups are served by all channels. The trunked radio system works to take advantage of the probability that not all groups need a traffic channel for communication at the same time. When a member of a group requests a call on a control or rest channel on which all of the mobile devices at a site idle awaiting new call notifications, in one embodiment, a call controller assigns a separate traffic channel for the requested group call, and all group members move from the assigned control or rest channel to the assigned traffic channel for the group call. In another embodiment, when a member of a group requests a call on a control or rest channel, the call controller may convert the control or rest channel on which the mobile devices were idling to a traffic channel for the call, and instruct all mobile devices that are not participating in the new call to move to a newly assigned control or rest channel selected from the pool of available channels. With a given number of channels, a much greater number of groups can be accommodated in a trunked radio system as compared with a conventional radio system.

Group calls may be made between wireless and/or wireline participants in accordance with either a narrowband or a broadband protocol or standard. Group members for group calls may be statically or dynamically defined. That is, in a first example, a user or administrator working on behalf of the user may indicate to the switching and/or radio network (perhaps at a call controller, PTT server, zone controller, or mobile management entity (MME), base station controller (BSC), mobile switching center (MSC), site controller, Push-to-Talk controller, or other network device) a list of participants of a group at the time of the call or in advance of the call. The group members (e.g., mobile devices) could be provisioned in the network by the user or an agent, and then provided some form of group identity or identifier, for example. Then, at a future time, an originating user in a group may cause some signaling to be transmitted indicating that he or she wishes to establish a communication session (e.g., group call) with each of the pre-designated participants in the defined group. In another example, mobile devices may dynamically affiliate with a group (and also disassociate with the group) perhaps based on user input, and the switching and/or radio network may track group membership and route new group calls according to the current group membership.

In some instances, broadband and narrowband systems may be interfaced via a middle-ware system that translates between a narrowband PTT standard protocol (such as P25) and a broadband PTT standard protocol (such as OMA-PoC). Such intermediate middle-ware may include a middle-ware server for performing the translations and may be disposed in the cloud, disposed in a dedicated on-premises location for a client wishing to use both technologies, or disposed at a public carrier supporting one or both technologies. For example, and with respect to FIG. 1, such a middle-ware server may be disposed in infrastructure RAN 152 at controller 156 or at a separate cloud computing cluster 162 communicably coupled to controller 156 via internet protocol (IP) network 160, among other possibilities.

The infrastructure RAN 152 is illustrated in FIG. 1 as providing coverage for the portable radio 104, RSM video capture device 106, laptop 114, smart glasses 116, and/or vehicle transceiver 136 via a single fixed terminal 154 coupled to a single controller 156 (e.g., radio controller, call controller, PTT server, zone controller, MME, BSC, MSC, site controller, Push-to-Talk controller, or other network device) and including a dispatch console 158 operated by a dispatcher. In other embodiments, additional fixed terminals and additional controllers may be disposed to support a larger geographic footprint and/or a larger number of mobile devices.

The controller 156 illustrated in FIG. 1, or some other backend electronic computing device existing on-premises or in the remote cloud compute cluster 162 accessible via the IP network 160 (such as the Internet), may additionally or alternatively operate as a back-end electronic digital assistant, a back-end audio and/or video processing electronic computing device, and/or a remote cloud-based storage device consistent with the remainder of this disclosure.

The IP network 160 may comprise one or more routers, switches, LANs, WLANs, WANs, access points, or other network infrastructure, including but not limited to, the public Internet. The cloud compute cluster 162 may be comprised of a plurality of computing devices, such as the one set forth in FIG. 2, one or more of which may be executing none, all, or a portion of an electronic digital assistant service, sequentially or in parallel, across the plurality of computing devices. The plurality of computing devices comprising the cloud compute cluster 162 may be geographically co-located or may be separated by inches, meters, or miles, and inter-connected via electronic and/or optical interconnects. Although not shown in FIG. 1, one or more proxy servers or load balancing servers may control which one or more computing devices perform any part or all of the electronic digital assistant function.

System 100 may additionally include a physical street sign 170, such as an intersection sign, that includes alphanumeric text and/or images that may identify, for example, two cross streets meeting one another at or near the location of the street sign 170. In other embodiments, various different types of signs, including physical or dynamically updateable electronic signs indicating construction updates, detours, events, traffic updates, advertisements, logos, building addresses, or other information may be implemented as well. The license plate 172 may be a physical or electronic display attached to the vehicle 132 that includes a unique identifier to uniquely identify (e.g., within a local region or area, county, city, state, or country) the vehicle 132 and may be linked to other information such as an owner, driver, employee, licensee, company, insurance information, traffic infraction information, make and/or model of the vehicle, or other information associated with the vehicle. The street sign 170 and the license plate 172 are merely example alphanumeric elements on graphical objects that will be described in more detail below with respect to the process 300 of FIG. 3.

Finally, although FIG. 1 describes a communication system 100 generally as a public safety communication system including a user 102 generally described as a police officer and vehicle 132 generally described as a police cruiser, in other embodiments, the communications system 100 may additionally or alternatively be a retail communications system including a user 102 that may be an employee of a retailer and a vehicle 132 that may be a vehicle for use by the user 102 in furtherance of the employee's retail duties (e.g., a shuttle or self-balancing scooter). In other embodiments, the communications system 100 may additionally or alternatively be a warehouse communications system including a user 102 that may be an employee of a warehouse and a vehicle 132 that may be a vehicle for use by the user 102 in furtherance of the employee's retail duties (e.g., a forklift).

In still further embodiments, the communications system 100 may additionally or alternatively be a private security communications system including a user 102 that may be an employee of a private security company and a vehicle 132 that may be a vehicle for use by the user 102 in furtherance of the private security employee's duties (e.g., a private security vehicle or motorcycle). In even further embodiments, the communications system 100 may additionally or alternatively be a medical communications system including a user 102 that may be a doctor or nurse of a hospital and a vehicle 132 that may be a vehicle for use by the user 102 in furtherance of the doctor or nurse's duties (e.g., a medical gurney or ambulance). In a last example embodiment, the communications system 100 may additionally or alternatively be a heavy machinery communications system including a user 102 that may be a miner, driller, or extractor at a mine, oil field, or precious metal or gem field and a vehicle 132 that may be a vehicle for use by the user 102 in furtherance of the miner, driller, or extractor's duties (e.g., an excavator, bulldozer, crane, or front loader). Other possibilities exist as well.

b. Device Structure

Figure 2:
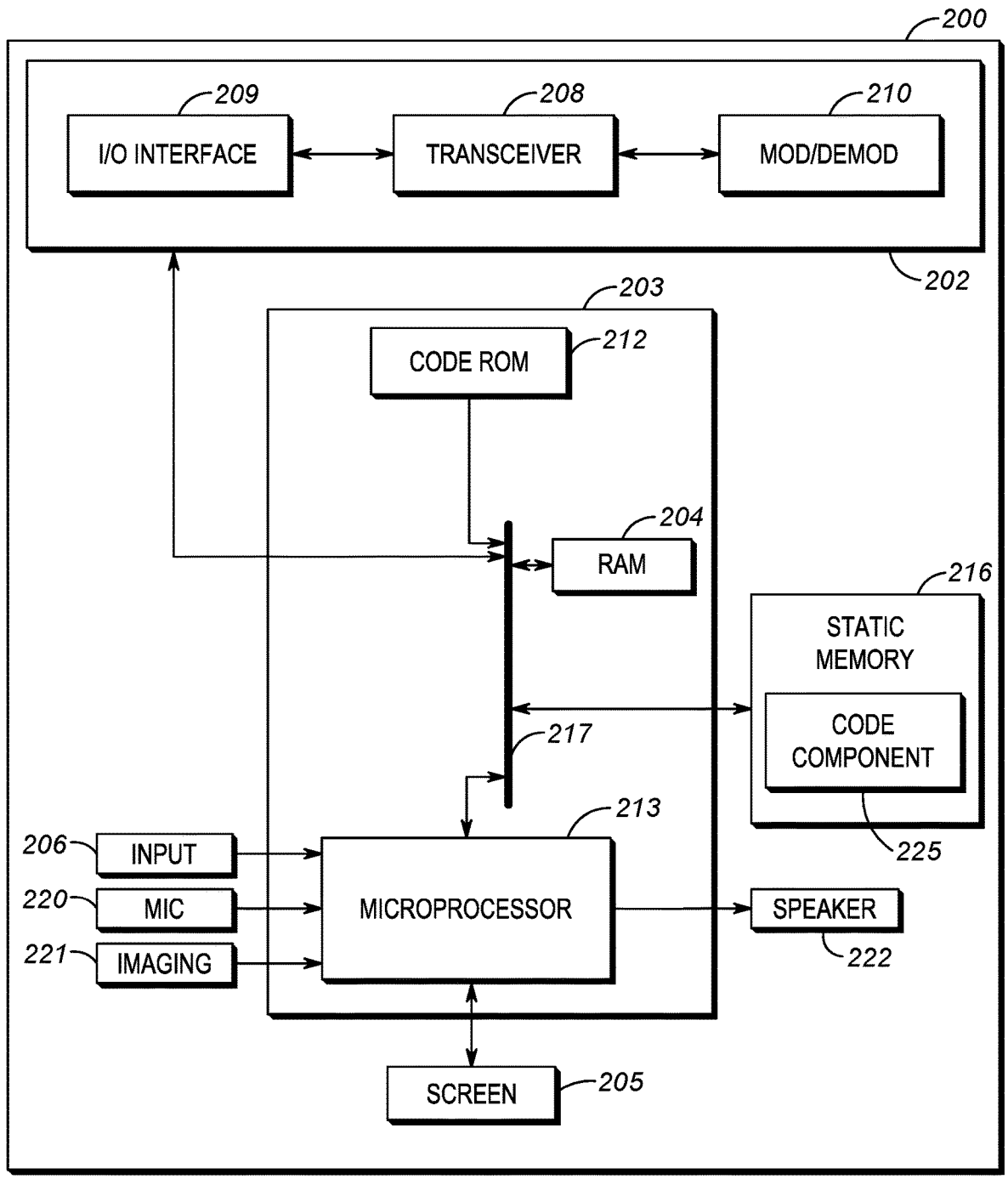
FIG. 2 is a device diagram showing a device structure of an electronic computing device for operating an electronic digital assistant, in accordance with some embodiments.

Referring to FIG. 2, a schematic diagram illustrates an electronic computing device 200 for operating an electronic digital assistant according to some embodiments of the present disclosure. Electronic computing device 200 may be, for example, embodied in the portable radio 104, RSM video capture device 106, laptop 114, smart glasses 116, vehicular computing device 133, controller 156, or some other electronic computing device not illustrated in FIG. 1 including the remote cloud compute cluster 162 described above, and/or may be a distributed computing device across two or more of the foregoing (or multiple of a same type of one of the foregoing) and linked via wired and/or wireless communication link(s). As shown in FIG. 2, computing device 200 includes a communications unit 202 coupled to a common data and address bus 217 of a processing unit 203. The computing device 200 may also include an input unit (e.g., keypad, pointing device, touch-sensitive surface, etc.) 206 and an electronic display screen 205, each coupled to be in communication with the processing unit 203.

A microphone 220 may be present for capturing audio from a user and/or other environmental or background audio that is further processed by processing unit 203 in accordance with the remainder of this disclosure and/or is transmitted as voice or audio stream data, or as acoustical environment indications, by communication unit 202 to other portable radios and/or other electronic computing devices. An imaging device 221 may provide video (still or moving images) of an area in a field of view of the computing device 200 (and perhaps also matching or containing a matching a field of view of a user associated therewith) for further processing by the processing unit 203 and/or for further transmission by communications unit 202. A communications speaker 222 may be present for reproducing audio that is decoded from voice or audio streams of calls received via the communication unit 202 from other portable radios, from digital audio stored at the computing device 200, from other ad-hoc or direct mode devices, and/or from an infrastructure RAN device, or may play back alert tones or other types of pre-recorded audio.

The processing unit 203 may include a code Read Only Memory (ROM) 212 coupled to the common data and address bus 217 for storing data for initializing system components. The processing unit 203 may further include a microprocessor 213 coupled, by the common data and address bus 217, to a Random Access Memory (RAM) 204 and a static memory 216.

The communications unit 202 may include one or more wired and/or wireless input/output (I/O) interfaces 209 that are configurable to communicate with other devices, such as a portable radio, laptop, wireless RAN, and/or vehicular transceiver.

For example, the communications unit 202 may include one or more wireless transceivers 208, such as a DMR transceiver, a P25 transceiver, a Bluetooth transceiver, a Wi-Fi transceiver perhaps operating in accordance with an IEEE 802.11 standard (e.g., 802.11a, 802.11b, 802.11g), an LTE transceiver, a WiMAX transceiver perhaps operating in accordance with an IEEE 802.16 standard, and/or other similar type of wireless transceiver configurable to communicate via a wireless radio network.

The communications unit 202 may additionally or alternatively include one or more wireline transceivers 208, such as an Ethernet transceiver, a USB transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The microprocessor 213 has ports for coupling to the input unit 206 and the microphone unit 220, and to the display screen 205, imaging device 221, and speaker 222. Static memory 216 may store operating code 225 for the microprocessor 213 that, when executed, performs one or more of the computing device steps set forth in FIG. 3 and accompanying text. Static memory 216 may also store, permanently or temporarily, cached images and/or video frames (full or partial) of captured objects and/or translated identifications and/or contents of objects detected in captured image or video frames, including but not limited to extracted alphanumeric text, in accordance with the description below.

Static memory 216 may comprise, for example, a hard-disk drive (HDD), an optical disk drive such as a compact disk (CD) drive or digital versatile disk (DVD) drive, a solid state drive (SSD), a tape drive, a flash memory drive, or a tape drive, to name a few.

2. PROCESSES FOR PROCESSING VIDEO RELATIVE TO A DETERMINED USER'S PERCEPTION OF SUCH VIDEO AND TAILORING AN ELECTRONIC DIGITAL ASSISTANT'S INQUIRY RESPONSE TO THE USER'S SUBSEQUENT QUERY

Figure 3:
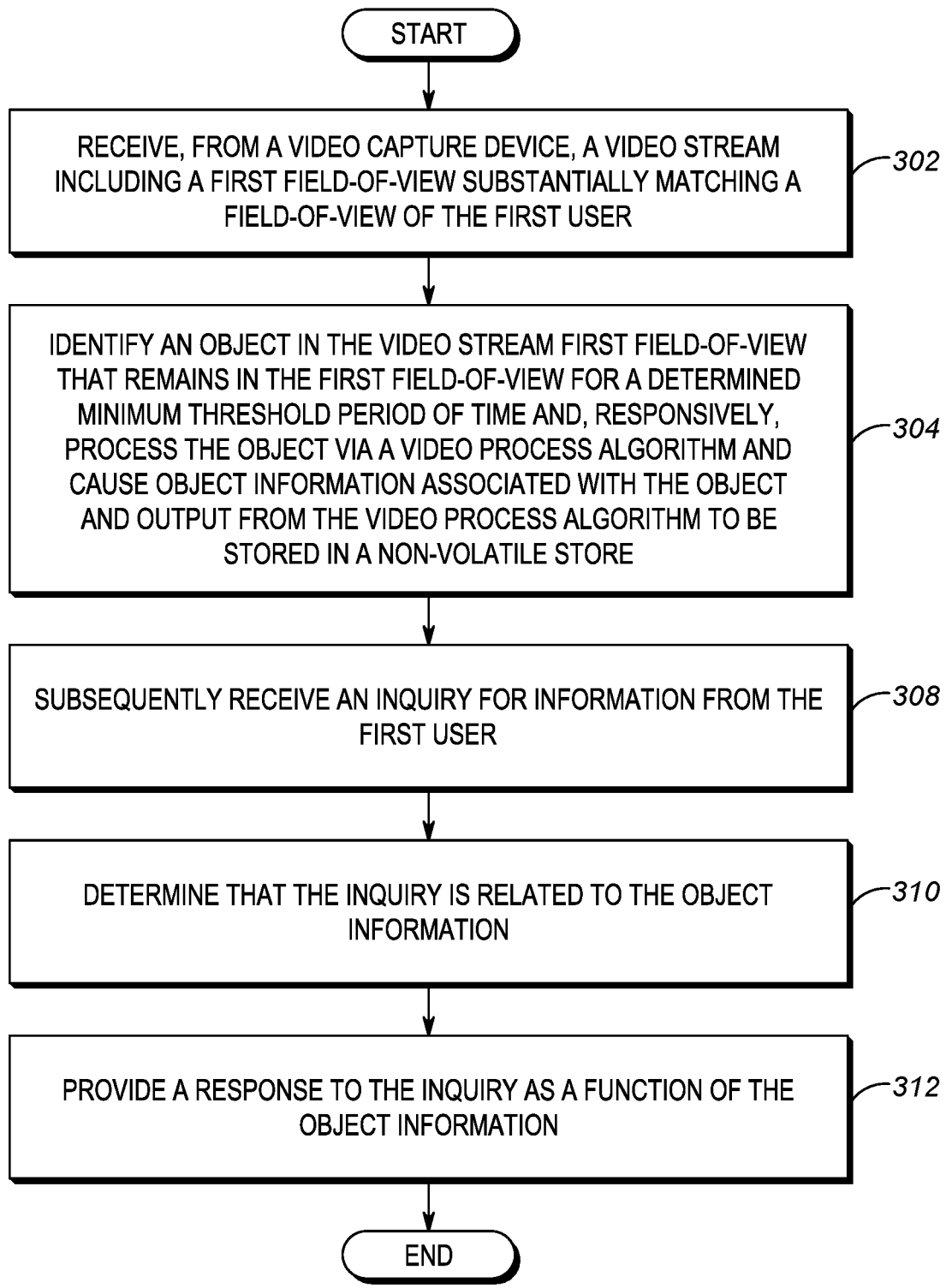
FIG. 3 illustrates a flowchart setting forth process steps for operating the electronic digital assistant of FIGS. 1 and/or 2, in accordance with some embodiments.

Turning now to FIG. 3, a flowchart diagram illustrates a process 300 for an electronic computing device operating as an electronic digital assistant to computationally process video relative to a determined user's perception of such video and to tailor an electronic digital assistant's inquiry response to a subsequent query from the user accordingly. While a particular order of processing steps, message receptions, and/or message transmissions is indicated in FIG. 3 for exemplary purposes, timing and ordering of such steps, receptions, and transmissions may vary where appropriate without negating the purpose and advantages of the examples set forth in detail throughout the remainder of this disclosure. The computing device may execute process 300 at power-on, at some predetermined periodic time period thereafter, in response to a trigger raised locally at the device via an internal process or via an input interface (e.g., the user enabling a particular feature associated with process 300 via an input interface or the computing device detecting that the computing device has entered a particular area or vehicle or that a user thereof has exited a particular area or vehicle, among other possibilities), or in response to detecting a trigger (including receipt of media content for processing in accordance with process 300) from some other portable radio, vehicle, infrastructure controller, or other computing device to which it is communicably coupled, among other possibilities.

The computing device executing process 300 may include an edge device same or similar to any one or more of the portable radio 104, the RSM 106, the laptop 114, the smart glasses 116, or the vehicle computing device 133 illustrated in FIG. 1, may include an infrastructure device same or similar to the controller 156 of FIG. 1, may include some other in-field, infrastructure RAN, or remote cloud computing cluster 162 device, or may include two or more of the foregoing operating in a distributed computing manner, among other possibilities.

Process 300 begins at step 302 where an electronic computing device operating as an electronic digital assistant receives, from a video capture device configured to track a gaze direction of a first user, a video stream including a first field-of-view substantially matching a field-of-view of the first user. The video capture device may be, for example, a pair of smart glasses such as smart glasses 116 of FIG. 1 that automatically physically track a field-of-view of the user 102 wearing them due to their physical design and positioning on the user's body and thus produces a video stream substantially directly matching (e.g., plus or minus 5° in any one direction) a field of view of its wearer. Additionally or alternatively, the smart glasses 116 may include some form of eye-tracking mechanism that may provide a more fine-grained input as to what portion of an overall vertical and horizontal field-of-view captured by a video capture device integrated with the smart glasses 116 that the user's 102 eyes are directed at or focused on. Of course, and as set forth earlier, in other instances, a separate head and/or eye-tracking electronic device such as the head and/or eye-tracking device 139 of FIG. 1 may be detached from the user 102 it is tracking but may similarly generate and provide information to the computing device (such as vehicular computing device 133) regarding a sub-portion of the user's 102 field-of-view captured via a vehicular camera such as vehicular video camera 134 that the user's 102 head and/or eyes are directed at or focused on. As just one example, the head and/or eye-tracking device may determine that, of an overall 120° field-of-view captured by an associated video capture device, a user's head and/or eyes are focused on an upper-left quadrant of the captured field-of-view video representing 60° in the vertical direction and 60° in the horizontal direction (e.g., ¼ of the originally captured field-of-view). Of course, other ranges of captured field-of-view may be captured by the associated video capture device (such as between 60° and 360°) and other fractional sub-portions of the captured field-of-view may be identified by the head and/or eye tracking device (such as ⅒ to ½ of the captured field-of-view perhaps depending on whether one or both of head-tracking and eye-tracking devices are present and providing field-of-view limiting indications to the electronic computing device).

Returning to the example driver's head and/or eye-tracking device 139 example of FIG. 1, the device 139 may be a rear-facing (in relation to the rear of the car) optical recording device that is capable of tracking a location of the driver's (e.g., user's 102) head and/or eye gaze and determining, based on the optical tracking, a direction in which the user 102 is looking (where 0° horizontally is directly forward and 90° is tangentially to the user's 102 right and which may continue around 360° to the 0° horizontal position again, and where 0° vertically is flush with a detected horizon and 90° is tangentially above the user 102 and which may continue around 360° to the 0° vertical position again). For example, the rear-facing device head and/or eye-tracking device 139 may optically track the user's 102 gaze using infrared light reflections to track movements in a center of the user's 102 pupil, front of the cornea, and/or back of the lens, or by tracking movements in detected retinal blood vessels. In other embodiments, the device 139 may use face-detection on captured 2D images to detect a direction in which the user's 102 face is directed. Still further, a depth camera may be used to capture 3D depth images and to detect a direction in which the user's 102 face is directed.

In still other embodiments, the device 139 may be an electro-mechanical system that may be physically coupled to the user's 102 head and may electro-mechanically detect the user's 102 head direction and transmit physical direction information in a manner similar to the foregoing. Still further, the device 139 may be an electromagnetic system disposed to detect changes in magnetic fields as the user 102 moves his or her head, and may similarly electronically communicate the detected user's 102 head position to the electronic computing device in accordance with the foregoing. Other possibilities for electro-mechanical tracking exist as well. And still other methods of tracking a user's 102 head and/or gaze direction are possible as well, inside of or outside of the vehicle 132 as described above. Other possibilities for tracking exist as well, including a combination of two or more of the foregoing.

The video stream received at the electronic computing device at step 302 may include a full field-of-view (e.g., larger than the user's field of view, such as from a 360° video capture device) captured by the video capture device, which may then be sub-sampled in accordance with additional head and/or eye-tracking information separately received from the video capture device (e.g., smart glasses) or some other separate head and/or eye-tracking device, or the video stream received at the electronic computing device at step 302 may be provided in an already sub-sampled state, wherein the video capture device or some other computing device communicably coupled to the video capture device (and perhaps embedded or incorporated in the head and/or eye tracking device) may perform the sub-sampling prior to providing the video stream to the electronic computing device at step 302.

The manner of extracting a limited field-of-view from a broader field-of-view included in the video stream, wherever performed, may vary depending upon the underlying media encoding method of the video stream. For media formats that fully encode all image data for each frame, sub-selecting the limited field-of-view may simply involve extracting those quadrants of the video stream corresponding to the more limited field-of view using the field-of-view information set forth above. For media formats that encode only changes in image data between key frames, sub-selecting the limited field-of-view may involve extracting those quadrants (or other region definitions including but not limited to point and radius, polygonal definitions, etc.) of the key frames corresponding to the extracted and limited fields-of-view, and re-encoding changes between the extracted key frame portions into a new encoded video stream using the field-of-view information set forth above. Other methods of sub-selecting in field-of-view are possible as well. For example, saccades are rapid movements between fixation points. These movements have unique patterns and are detectable. These movements can be used to mark content the user probably absorbed, at the fixation points, and content in areas between those points are not marked as absorbed by the user.

In some embodiments, the video capture device providing the video stream at step 302 may include or be associated with a separate audio capture device, and an audio stream may be provided to the electronic computing device at step 302 accompanying the video stream for further use at step 304. For example, the microphone 135 coupled to the video camera 134 may capture ambient audio, including voice audio generated by user 102, and provide a corresponding audio stream to vehicular computing device 133, controller 156, and/or cloud computer cluster 162, among other possibilities.

After receiving the video stream at step 302 (and optionally a corresponding audio stream as well), process 300 continues to step 304, where the electronic computing device identifies an object in the video stream first field-of-view remaining in the first field-of-view for a determined threshold period of time and, in response, processes the object via a video processing algorithm. The video processing algorithm generates object information that is provided to the electronic computing device, which may then store the object information and any other corresponding metadata (including audio) in a non-volatile store for future reference in responding to queries from the user. In embodiments where the electronic computing device is provided a full field-of-view video stream and field-of-view identification information identifying a subset of the field-of-view of a user associated with the video stream, the electronic computing device may separately process portions of the video stream matching the field-of-view identification information and store object information identified in the matching field-of-view portions of the video stream as in-view object information and portions of the video stream not matching the field-of-view identification information and store object information identified as outside of the matching field-of-view portions of the video stream as out-of-view object information.

The identified object may be any type of material thing that can be seen and (hypothetically though not literally) touched by the user, such as a person, building, tool, animal, sign, event, vehicle, or other type of object. The electronic computing device may apply an object-recognition algorithm having access to a database of known objects to the received video stream (including the in-field-of-view stream and/or the out-of-field-of-view video stream) and identify one or more objects that match known object(s) from the object recognition database. Various image processing algorithms may be used to match objects in the video stream received at step 302 to a known object, including but not limited to geometric hashing, edge detection, scale-invariant feature transform (SIFT), speeded-up robust features (SURF), neural networks, deep learning, genetic, gradient-based and derivative-based matching approaches, Viola-Jones algorithm, template matching, or image segmentation and blob analysis. Other possibilities exist as well. Once an object is matched, metadata describing the object from the object recognition database (e.g., identifying the object as a person, a vehicle, a building, a tool, an animal, a sign, an event, a vehicle, or some other type of object) may be embedded and stored within the video stream prior to storing the video stream, or may be stored in a separate video stream metadata file and stored accompanying the video stream (and both associated with the user). Additional metadata regarding the identified object may be identified and/or extracted from the video stream or other sources (such as audio, as set forth in more detail below) and stored as well, including but not limited to a color of the object, a time (point in time or a time window in which it is partially (25% or less) or mostly (50%-90%) or entirely (100%) visible) during which the object appeared in the video stream, a location at which the object was detected (perhaps received via a location-determination device integrated with the electronic computing device or communicably coupled to the electronic computing device, or determined via video analytics of surrounding objects such as street signs), a role and/or identity of the user, a current incident with which the user is currently associated, or some other contextual information.

In one example, the object may be an alphanumeric text object (such as a police report) or some graphical object including alphanumeric text (such as the street sign 170 of FIG. 1), and stored object information associated with such an object may include an identity of the object (e.g., "police report" or "street sign" or "license plate" as determined via the object recognition algorithm and database) and an optical character recognition translation of the alphanumeric contents of the object (e.g., a name, location, address, time, witness name(s), incident title or identifier, or status with respect to alphanumeric content of the police report or respective street names appearing on the street sign graphical object or a respective license plate number appearing on a license plate graphical object) perhaps accompanying the additional metadata already noted above. Other types of objects containing alphanumeric content could be similarly processed by the video processing algorithm and similar object information generated and stored accompanying the video stream and associated with the user.

In other examples, the object may be a graphical object that does or does not otherwise include alphanumeric text, and the object information may include an identification of a type of the graphical object (e.g., a tea pot), a definition associated with the identified type of graphical object (e.g., a vessel for boiling water), and/or a unique identity of the graphical object (e.g., tea pot at suspect John Smith's residence) perhaps accompanying the additional metadata already noted above.

In still further examples, the object may be a capture of a human face, and the electronic computing device may apply a face-recognition algorithm having access to a database of known faces to the video stream and the stored object information may include a graphical capture of the face, unique characteristics of the identified human face graphical object (e.g., such as distance measurements between facial features, measured sizes of facial features, etc.), and/or a determined unique identity of the person determined to match the human face graphical object via a face-recognition algorithm and database function. Various facial recognition image processing algorithms may be used to match stored faces associated with known criminal organization associates, including but not limited to a high dimensional local binary pattern (LBP) algorithm, a Fisher vector algorithm, a Joint Bayesian algorithm, and an associated predict algorithm. Other types of facial recognition image processing algorithms could be used as well.

In an additional embodiment, the electronic computing device may further access audio portions of the audio stream (if available) matching the video stream in order to extract and capture additional object information relative to objects identified in the video stream. For example, the user associated with the video stream may provide auditory comments contemporaneously with the capture and generation of the video stream that may provide additional description and/or aid the electronic computing device in identifying one or more objects in the video stream. The user may comment that "the tea kettle is still hot", which may then be captured and used by the object recognition algorithm to aid in identifying the object as a tea kettle, confirm the otherwise identification of the object as a tea kettle, and/or provide additional metadata (e.g., it was "hot") for storage as objection information accompanying the identity of the object associated with the user. Such captured audio can also aid the electronic computing device in determining which portions of a police report within the user's field of view the user has read and comprehended in those instances where the user may read portions of the police report aloud, and/or may aid the optical character recognition algorithm in converting (and/or confirming a transcription of) the text in the report to text for storage in the stored object information. Other possibilities exist as well.

The electronic computing device may subsequently actively maintain one or both sets of in-view object information and out-of-view object information associated with the user in accordance with one or more object information maintenance rule sets. The object information maintenance rule sets may be applied to all users, may vary based on a role or identity of the user, or may be individually set by the user, among other possibilities. One rule in the object information maintenance rule set may set forth an expiration timer that identifies how long object information identified and stored at step 304 is maintained as associated with the user. After expiration of the timer, the object information may be archived, deleted, removed, and/or otherwise made inaccessible for subsequent steps of process 300, including step 312 that generates a response to a user inquiry as a function of the object information associated with the user. A threshold period of time for the expiration timer is a predetermined estimated time that the user will independently retain information relative to the in-view object information after viewing the object in his or her field of view. The threshold period of time may be a statically applied threshold period of time in the range of four to twenty-four hours, or ten to sixteen hours, or twelve hours. Other static periods of time are possible as well. In other embodiments, the applied threshold period of time for the expiration timer may be dynamic and set based on one or more context parameters, including but not limited to one or more of a determined age of the user associated with the video stream (as retrieved from an employment database, for example, the higher the age the lower the threshold period of time), a measured amount of time the object remained in the field of view of the user (the longer the object remained in the user's field of view, the higher the threshold period of time), a number of times the user looked away from (i.e., the object left the user's field of view) and then returned to the object (i.e., the object returned to the user's field of view, the higher number of times, the higher the threshold period of time), a size of the object, certain key words appearing on the object, or some other context parameter relating to the user or to the object. In other embodiments, a time passed since an object was last seen may be mapped to a probability of recollection, and a probability of recollection value calculated as a function of the time passed (amongst other parameters including those set forth above) and compared to a predetermined organization-wide or per-user minimum recollection probability value to determine if the electronic computing device should continue to maintain an association between the object information identified and stored at step 304 and the user.

In still further embodiments, some objects may be identified as exempt from the expiration time or subject to a lower minimum recollection probability value (including none at all). These may be items, for example, that have special characteristics determined that an average user (or a particular user) would normally maintain for a long or indefinite period of time. For example, a location or date, or objects involved in, a traumatic event such as a detected explosion in a field of view of the user may be considered as exempt from the expiration time or subject to a lower minimum recollection probability value.

Process 300 then continues to step 308, where the electronic processing device subsequently receives an inquiry for information from the user associated with the video stream. The inquiry may, for example, be in the form of a voice request captured via an integrated microphone at the electronic computing device, or a voice request captured at some other device and provided to the electronic computing device (e.g., in an audio or transcribed form) via one or more wired or wireless networks consistent with the system architecture described above with respect to the system 100 of FIG. 1. In other embodiments, the inquiry may be in the form of a text message, e-mail, instant message, or some other input entry mechanism.

The inquiry may include one or more of a time indication, a location indication, an incident indication, a person indication, an object indication, or some other indication which may or may not match one or more object information generated and stored at step 304.

As one example, the content of the inquiry may request "what were the names of the cross streets at the incident in the Bucktown neighborhood of Chicago?" The request may be a voice request made to the electronic computing device by the user (an officer) after the officer returned from the incident to a police station and began to write up a report. As another example, the content of the inquiry may request "what was the license plate on the green car at the incident scene this morning?" or "what was the name of the first witness in the incident report for the retail store robbery?" Different inquiries may be made in different industries outside of public safety as well. For example, a retail security employee may request "what was the name of the product the suspect thief took off the shelf and put in his jacket?", and/or an oil/gas engineer may ask "what was the identity of the leaking well I ran across at around 3 pm yesterday?"

Process 300 then continues to step 310, where the electronic processing device determines that the user inquiry (e.g., also herein identified as a user search query) is related to previously stored object information. For example, the electronic computing device may voice-to-text convert the inquiry (if not already in text form), parse the inquiry, and attempt to match one or more search terms in the inquiry to previously stored object information associated with the user.

Additionally or alternatively, time and/or location indications in the query may be matched against stored object information including corresponding time and/or location indications.

As one particular example, a user search query of "what was the license plate on the green car at the incident scene this morning?" may be parsed and matched by the electronic computing against stored object information that includes a date stamp of the same day, a time indication occurring in the morning (e.g., 12:01 AM-11:59 AM), tagged with an incident identifier associated with a car accident, and/or an object descriptor including the terms "green" and "car".

As another particular example, a user search query of "what was the witnesses' name from the police report about the WAL-STORE robbery I read yesterday?" may be matched by the electronic computing against stored object information that includes a date stamp of the prior day, tagged with an incident identifier associated with a theft, and/or an object descriptor including the terms "police report" and/or "WAL-STORE."

As a still further example, a search query of "what was the gas station employee John's last name that I spoke with yesterday?" may be matched by the electronic computing against stored object information that includes a date stamp of the prior day, tagged with a person's name including John as a first name (e.g., determined via facial recognition, via scan of a name badge, or via audio input detection), and/or an object descriptor or location metadata including the term "gas station."

Process 300 then continues to step 312, where the electronic processing device provides a response to the user inquiry as a function of the previously stored object information associated with the user. The response to the user inquiry could be provided in a number of ways. For example, the response could be in the form of a voice output that is re-produced locally at the electronic computing device, or transmitted to some other mobile or electronic computing device associated with the user for reproduction. For example, providing the response may include generating a text-based output for reproduction at the electronic computing device or some other mobile or vehicular computing device associated with the user (e.g., including an output transducer speaker associated with the user) via a text-to-voice software component at the electronic computing device, mobile device, or vehicular computing device that converts the text to voice for output to the user via the local output transducer speaker. For example, an electronic digital assistant operating at controller 156 or RSM 106 may provide the response by generating an auditory output text file and transmitting it to laptop 114 for reproduction. As another example, an electronic digital assistant operating at laptop 114 may provide the response by generating an auditory output text file for local reproduction at the laptop 114.

Alternatively, providing the response at step 312 may include generating a digital audio file with digitally-encoded speech that recites a substantive content generated as a function of the object information at step 312 for reproduction to the user. For example, an electronic digital assistant operating at controller 156 or RSM 106 may generate an auditory output digitally-encoded speech file and transmit it to laptop 114 for reproduction. As another example, an electronic digital assistant operating at laptop 114 may generate an auditory output digitally-encoded speech file for local reproduction at the laptop 114.

Of course, in other embodiments, providing the response may merely include transmitting an instant message, a text message, an e-mail, or some other text-based query response that provides an answer to the user query as a function of the object information. Other possibilities exist as well.

In still other embodiments, the response may be provided to the user (or to a group including the user) by playing back audio of the response (generated in any of the ways set forth above) over an established PTT narrowband or broadband voice channel (private call or group call session), using any one or more of the broadband and narrowband applications or protocols set forth earlier.

In a particular example where the related object information identified at step 310 was one of an alphanumerical text object and a graphical object including alphanumerical text, the related object information may include alphanumerical text corresponding to the alphanumerical text object or extracted from the graphical object, and the response to the user inquiry at step 312 may include at least a portion of, or all of, one of the alphanumerical text itself or a transformation of the alphanumerical text into an audio reproduction. Using the example inquiry set forth earlier, a user search query of "what was the license plate on the green car at the incident scene this morning?" may be matched against corresponding related object information at step 310 and the electronic computing device may identify a license plate alphanumeric content matching the user query of "XYZ123 IL" and provide a response at step 312 of an auditory recitation of the alphanumeric context "XYZ123 IL" in some manner as already described above, or may provide the alphanumeric text back to the requesting user in any number of other manners, including a text message, e-mail, or instant message, among other possibilities. A similar response could be provided where the inquiry is for a street sign with the response including alphanumeric text extracted from a street-side physical or electronic sign.

In some embodiments wherein the alphanumerical text may not be fully extracted from the graphical object, an indication may be stored in the object information noting the existence of additional potential text that could not be translated with a high level of confidence (e.g., greater than 50% or greater than 70% or 90% confidence), and the response provided at step 312 may provide an auditory indication of the existence of potential additional text (e.g., a predetermined auditory tone or a generated spoken voice indication that "additional un-translatable text exists"), which could then act as a cue to the user to view the graphic object themselves and perhaps further attempt to decipher or otherwise match the information.

In other embodiments wherein the inquiry is related to a street sign, license plate, or other alphanumeric text on a graphical object that the user just passed (e.g., while in a moving vehicle), and which the electronic digital assistant may detect that the user looked at for some minimum period of time but perhaps was unable to fully process, a response to an inquiry of "what was the text on that street sign I just passed?" may be matched to objects detected within a threshold period of time on the order of seconds (e.g., 1-30 or 1-10 seconds ago) after the inquiry was received. In such cases, the threshold period of time during which the object must remain in the user's field of view for the electronic digital assistant to consider the object absorbed may be lowered beyond a default value or value assigned to other contextual situations, and may be on the order of tenths of a second or single-digit integer seconds (e.g., under 10 s).

In a further particular example where the related object information identified at step 310 was an alphanumerical text object that was a public safety report regarding an incident such as a police report, the related object information may include alphanumerical text extracted from the police report, including portions of the police report that the user read (e.g., spent sufficient threshold time on for the electronic computing device to consider it absorbed by the user, such as 10-60, or 20-40, or 30 seconds) and/or portions of the police report that the user did not read (e.g., that existed on the page but were not viewed in the user's field-of-view as determined at step 302 and 304 or were viewed by the user but not for the sufficient threshold time to be considered absorbed by the user). Using the example inquiry set forth earlier, a user search query of "what was the witnesses' name from the police report about the WAL-STORE robbery I read yesterday?" may be matched against corresponding related object information at step 310 and the electronic computing device may identify a name of a witness from the police report of "John Jacobs" and provide a response at step 312 of an auditory recitation of the alphanumeric text "John Jacobs" in some manner as already described above, or may provide the alphanumeric text back to the requesting user in any number of other manners, including a text message, e-mail, or instant message, among other possibilities. Other types of text-based reports or work assignments could be used as well, such as a work order, a financial report, or other such alphanumeric text-based documents.

In embodiments in which an additional second witness was included in the report but the electronic computing device did not (or was not configured to) distinguish between read and unread portions of the report, the response provided at step 312 may include both witnesses.

In embodiments in which the electronic computing device did (or was configured to) distinguish between read and unread portions of the report and the additional second witness was included in an un-read portion of the report, the electronic computing device may name the first witness "John Jacobs" in the response at step 312, and may optionally notify the user in a same or supplementary response that a second witness ("Jack Smith") is included in unread portions of the report, and may name the second witness in the response as well.

In still other embodiments in which the electronic computing device did (or was configured to) distinguish between read and unread portions of the report and the additional second witness was included in an un-read portion of the report, the electronic computing device may alternatively assume that the user already knows of the first witness "John Jacobs," and instead respond with only the name of the second witness "Jack Smith" that the electronic digital assistant determined that the user did not read about yet (or looked at but not long enough to meet the minimum threshold for the electronic computing device to determine that the user absorbed the material) in the response at step 312, and may optionally notify the user in a supplementary response (automatically or upon request) that the first witness was included in the read portions of the report that the user already read and absorbed, and may name the first witness in the supplementary response as well.

In additional embodiments, responses to the above or other inquiries relating to police reports may further include a name, location, address, time, or status extracted from the public safety report that is responsive to the inquiry, among other possibilities.

In a further particular example where the related object information identified at step 310 was a graphical object, the related object information may include graphical object identification information that identifies the graphical object, and the response to the inquiry may include either or both of a graphical representation of the graphical object and a textual description of the graphical object. As one example, a user inquiry of "what was the name of the product the suspect thief took off the shelf and put in his jacket at the WAL-STORE incident yesterday afternoon?" may be matched against corresponding related object information that may include an image capture of a graphical object (such as a cellular phone box that was attempted to be stolen) and/or a textual description of the graphical object generated at step 304 (e.g., "a cellular phone model X1X package"), and the response to the inquiry may include a copy of the graphical object (e.g., sent as data via a same application as the user inquiry was sent, or via a text message, instant message, or e-mail, or some other mechanism supporting graphical data), and/or may include a textual description of the graphical object provided via an auditory response in a manner such as already described above. In embodiments where both the graphical and textual descriptions of the object are provided in the response, the response may be provided via same or separate transport mechanisms.

In a further particular example where the related object information identified at step 310 was a graphical object capture of a human face, the related object information may include an identity of a person matching the captured human face via a facial recognition look-up, and/or descriptive aspects thereof (such as hair color, skin color, clothing color, identified jewelry or accessories, etc.) and the response to the inquiry may include an image capture of the human face, the identity of the person matching the captured human face, and/or one or more of the descriptive aspects thereof. As one example, an inquiry of "who was the person accused of stealing the product at the WAL-STORE incident yesterday afternoon?" may be matched against corresponding related object information that may include an image capture of the suspect thief and/or an identity of the suspect thief (e.g., determined via a face recognition match to a prior offender database), and the response to the inquiry may include an image copy of the face as a graphical object and/or a textual description of the graphical object (e.g., the thief suspect's identity) provided via an auditory response in a same or different manner as the graphical object, either or both provided in a manner as already described above.

In any of the examples set forth above in which a graphical object is provided in the response at step 312, the electronic computing device may take the further step of identifying a central frame in time from the video stream having a minimum level of blur, storing the central frame (or a portion thereof including the graphical object identified in the video stream central frame) as object information, and provide the all or the portion of the central frame including the graphical object in the response to the inquiry.

In still other examples, and in embodiments where audio is captured at a same time as the video containing the object was captured at step 302, the response to the inquiry may include a reproduction of some or all of the audio actually captured at step 302, perhaps in addition to a generated response in the manner as set forth above or in place of the generated response set forth above. For example, and using the example above where a search query of "what was the gas station employee John's last name that I spoke with yesterday?" and the response includes the employee John's last name extracted from object information, the user may further request a playback of audio reflecting the conversation with John at that time, and a supplementary response generated and provided to the user at step 312 may then include a copy of the audio captured during a same time (or within a determined period of) that the prior object information was matched. In another embodiment where the name badge wasn't scanned to generate the object information but the user read aloud the name badge, which was captured by the electronic digital assistant, the response to the inquiry may include a playback of the user originally reading the employee's name badge aloud, instead of or in place of the electronic reproduction of the voice transcription of the information. Other examples are possible as well.

3. CONCLUSION

In accordance with the foregoing, an improved device, method, and system is disclosed for an electronic digital assistant to computationally process video relative to a determined user's perception of such video and to tailor the electronic digital assistant's inquiry response to the user's subsequent query accordingly.

As a result of the foregoing, and in some embodiments, electronic digital assistants computationally determine to provide or to avoid providing information in a response to a user inquiry that the electronic digital assistant determines the user already knows based on the extracted user field-of-view and object recognition technical functions set forth above. Accordingly, electronically generated user search inquiry responses can provide more individualized content to a user based on prior user detected perceptions of objects via video analytics occurring within a determined threshold period of time. Other features and advantages are possible as well.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for tailoring an electronic digital assistant generated inquiry response as a function of previously detected user ingestion of related information, the method comprising:

receiving, at an electronic processing device from a video capture device configured to track a gaze direction of a first user, a video stream including a first field-of-view substantially matching a field-of-view of the first user based on the tracked gaze direction of the first user;

identifying, by the electronic processing device, a first object in the video stream first field-of-view that is determined, based on the tracked gaze direction of the first user, to remain in the first field-of-view for a configured minimum threshold period of time and, responsively, processing the first object via a video processing algorithm and causing, by the electronic processing device, first object information describing the first object or contents thereof to be stored in a non-volatile store and associated with the first user as perceived by the first user;

subsequently receiving, at the electronic processing device, one of a text and voice-based inquiry for information responsive to the inquiry from the first user;

determining, by the electronic processing device by matching information included in the inquiry to the first object information stored in the non-volatile store, that the inquiry is related to the first object perceived by the first user; and providing, by the electronic processing device, a response to the inquiry having a content generated as a function of the first object information stored in the non-volatile store.

2. The method of claim 1, wherein the first object is one of an alphanumerical text object and a graphical object including alphanumerical text, the first object information includes alphanumerical text corresponding to the alphanumerical text object or extracted from the graphical object, and the response to the inquiry including at least a portion of one of the alphanumerical text itself or a transformation of the alphanumerical text into an audio reproduction.

3. The method of claim 2, wherein the first object is the alphanumerical text object and is a report regarding an incident or a work assignment order, and the response to the inquiry includes a name, location, address, time, or status extracted from the report or order and responsive to the inquiry.

4. The method of claim 2, wherein the first object is the graphical object including alphanumerical text and is a street sign or roadside electronic display, and the response to the inquiry includes alphanumeric text extracted from the street sign or roadside electronic display.

5. The method of claim 1, wherein the first object is a graphical object, the first object information includes graphical object identification information that identifies the graphical object by type, definition, or identity, and the response to the inquiry includes a graphical representation of the graphical object.

6. The method of claim 5, wherein the graphical object is a capture of a human face, the graphical object identification information is an identity of a person matching the captured human face via a facial recognition look-up, and the response to the inquiry includes the capture of the human face and the identity of the person matching the captured human face.

7. The method of claim 5, further comprising identifying, by the electronic processing device, a central frame in time from the video stream having a minimum level of blur, and providing all or a portion of the central frame including the first object in the response to the inquiry.

8. The method of claim 1, the method further comprising storing, accompanying the first object information, a time and/or date at which the first object first and/or last appeared in the video stream first field-of-view.

9. The method of claim 8, wherein the inquiry includes a time limitation, and the step of determining, by the electronic processing device, that the inquiry is related to the first object information includes determining that the stored time and/or date matches the time limitation in the inquiry.

10. The method of claim 1, further comprising, after a configured second threshold period of time, one of deleting the first object information and refraining from providing a response to a subsequent inquiry from the user as a function of the first object information.

11. The method of claim 10, wherein the configured second threshold period of time is a predetermined predicted time that the first user will independently retain information relative to the first object after perceiving the first object in the first field of view.

12. The method of claim 11, wherein the configured second threshold period of time is varied based on one or both of a measured amount of time the first object remained in the video stream first field of view and a measured number of repetitions in which the first object reappeared in the video stream first field of view.

13. The method of claim 1, wherein the video capture device configured to track the gaze direction of the first user includes a user-mounted or vehicle-mounted video capture device having a relatively large field-of-view and a head-tracking or eye-gaze tracking device, and wherein the relatively large field-of-view is reduced to the first field-of-view via video processing and as a function of head-tracking information or eye-gaze tracking information of the first user received via the corresponding head-tracking or eye-gaze tracking device.

14. The method of claim 1, wherein the video capture device configured to track the gaze direction of the first user is a video capture device having a capture field-of-view substantially matching a wearer's field-of-view and is physically coupled to the first user's head.

15. The method of claim 1, further comprising refraining from storing second object information describing second objects or contents thereof in the video stream that are determined, based on the tracked gaze direction of the first user, to not remain in the first field-of-view for the configured minimum threshold period of time and determined to not have been perceived by the first user; and providing the response to the inquiry having the content generated as a function of the first object information determined to have been perceived by the first user and not the second object information determined to not have been perceived by the first user.

16. The method of claim 1, wherein the providing the response to the inquiry having the content generated as a function of the first object information comprises refraining from including in the response the first object or the first object information, and instead, providing additional information in the response that assumes that the first user is already aware of and has knowledge of the first object and/or the first object information that otherwise would be responsive to the inquiry.

17. An electronic processing device for tailoring an artificial intelligence inquiry response as a function of previously detected user ingestion of related information, the device comprising:
- a memory;
- a transceiver; and
- one or more processors configured to:
    - receive, from a video capture device configured to track a gaze direction of a first user, a video stream including a first field-of-view substantially matching a field-of-view of the first user based on the tracked gaze direction of the first user;
    - identify a first object in the video stream first field-of-view that is determined, based on the tracked gaze direction of the first user, to remain in the first field-of-view for a configured minimum threshold period of time and, responsively, process the first object via a video processing algorithm and cause first object information describing the first object or contents thereof to be stored in a non-volatile store and associated with the first user as perceived by the first user;
    - subsequently receive one of a text and voice-based inquiry for information responsive to the inquiry from the first user;
    - determine, by matching information included in the inquiry to the first object information stored in the non-volatile store, that the inquiry is related to the first object perceived by the first user; and
    - provide a response to the inquiry having a content generated as a function of the first object information stored in the non-volatile store, via one of the transceiver, a display communicatively coupled to the electronic computing device, or a speaker communicatively coupled to the electronic computing device.

18. The device of claim 17, wherein the one or more processors are further configured to:
- refrain from storing second object information describing second objects or contents thereof in the video stream that are determined, based on the tracked gaze direction of the first user, to not remain in the first field-of-view for the configured minimum threshold period of time and determined to not have been perceived by the first user; and
- provide the response to the inquiry having the content generated as a function of the first object information determined to have been perceived by the first user and not the second object information determined to not have been perceived by the first user.

19. The device of claim 17, wherein the one or more processors are further configured to provide the response to the inquiry having the content generated as a function of the first object information by refraining from including in the response the first object or the first object information, and instead, providing additional information in the response that assumes that the first user is already aware of and has knowledge of the first object and/or the first object information that otherwise would be responsive to the inquiry.

20. The device of claim 17, wherein the one or more processors are further configured to, after a configured second threshold period of time, one of delete the first object information and refrain from providing a response to a subsequent inquiry from the user as a function of the first object information.

* * * * *